Feb. 26, 1935.  H. L. SMITH  1,992,246
ELECTRICAL CIRCUIT
Filed Oct. 11, 1933

Inventor
HAROLD L. SMITH.
By
Attorney

Patented Feb. 26, 1935

1,992,246

UNITED STATES PATENT OFFICE 1,992,246

ELECTRICAL CIRCUIT

Harold L. Smith, South Euclid, Ohio

Application October 11, 1933, Serial No. 693,137

3 Claims. (Cl. 172—288)

This invention relates to electrical apparatus and more particularly to circuits for electric motors.

One of the objects of the invention is to provide a new and improved circuit for electric motors.

Another object of the invention is to provide an electric motor circuit having a new and novel association of electrical elements cooperatively related to control the flow of current to the motor in a new and improved manner to energize the motor by steps and eliminate shock and resultant injury to the motor.

Another object of the invention is to provide an electric motor circuit of the character described in which the electrical devices cooperate to complete the stepped energization of the motor in a time period proportional to its load or rate of acceleration.

Another object of the invention is to provide a time current relay circuit for electric motors in which the intended function of delaying the application of the entire current to the motor for a period of time is carried out even though the motor might be too heavily loaded to operate.

Another object of the invention is to provide a circuit for electric motors in which there are a plurality of steps in accelerating the motor, the time current relays being arranged to automatically and successively operate to periodically increase the amount of current passing to the motor until such time as the motor receives the full line voltage.

More specifically it is an object of the invention to provide a circuit for electric motors having devices for automatically causing the motor to be energized rapidly by steps for light loads and relatively slower for heavy loads to thus permit utilization of the motor to its fullest extent, in regard to time, without shocking or otherwise injuring the motor.

These objects and the several novel features of the invention are hereinafter more fully described and claimed, and the preferred form of construction of a circuit for an electric motor embodying my invention is shown in the accompanying drawing in which—

Figure 1:
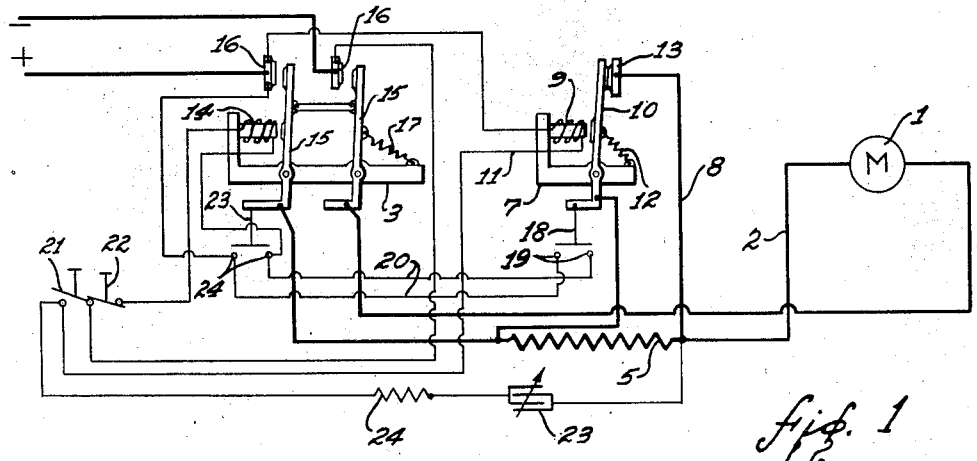
Fig. 1 is a diagrammatic view of an electric motor circuit embodying my invention.

It is well known that, when electric motors are started by immediately applying the entire line current and voltage thereto, they receive a shock which results after a period of time in the necessity for repairs and replacement of parts. In the drawing there is illustrated circuits for connecting electric motors to a source of electrical energy in a manner so that after the line switch is closed the motor is energized by steps to thus avoid damaging the motor. This is accomplished in this instance by providing for a definite amount of current of less value than the line current to energize the motor when the line switch is closed and to provide for an elapse time period before electrically operated mechanism in the circuit automatically operates to permit the entire voltage to pass to the motor. In these circuits the electrical devices not only cooperate to energize the motor by steps, but do so in a time period proportional to the magnitude of the load carried by the motor. Thus for motors required to operate under loads of various magnitudes the elapsed time period between starting and when the motor receives the full line voltage will be longer for heavy loads than for light loads which enables the motor to be utilized to its fullest extent in regard to time without damaging the same.

Figure 2:
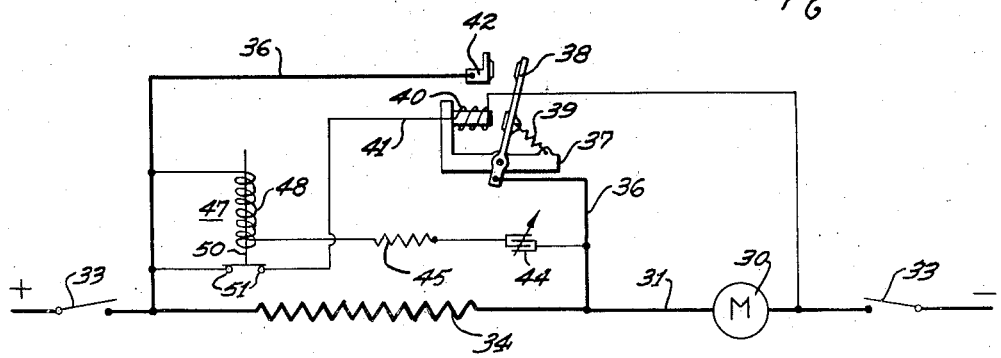
Fig. 2 is a diagrammatic view of an electric motor circuit embodying another form of my invention.
Figure 3:
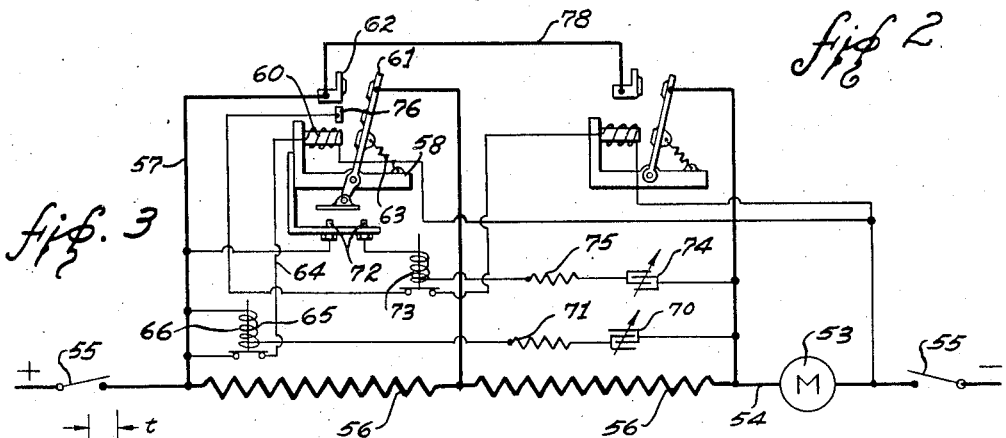
Fig. 3 is a diagrammatic view of an electric motor circuit embodying still another form of my invention.

The circuit arrangement of Fig. 1 is suitable for motors using fifty amperes or less while the circuit of Fig. 2 is suitable for any size motors. The circuit of Fig. 1 could be used with motors using more than fifty amperes but would probably be more expensive than the circuit of Fig. 2. The circuit of Fig. 3 illustrates one in which there may be any number of steps in accelerating the motor.

Referring now in detail to the drawing and particularly to Fig. 1 thereof, the numeral 1 designates an electric motor in the line 2 which is energized from a source of electrical energy when the line switches, indicated in general at 3, are closed. A resistance 5 is provided in the line 2 to prevent the motor from receiving the full value of the current when the switches 3 are closed, and in parallel shunt circuit with the resistance 5 is an electrically operated time switch 7 adapted to operate after a period of time following the closing of the line switch 3 to short circuit the resistance 5 and connect the motor directly with the source of electrical energy.

The resistance 5 provides for limiting definitely the amount of current desired to energize the motor 1 upon closing of the line switches 3 and this resistance 5 may be in the form of a rheostat if desired so as to be able to vary the value of the current passing therethrough to the motor. In conjunction with the current resistance 5, the switch 7 operates to short circuit the resistance 5 after a period of time which time is dependent upon the load or rate of acceleration of the motor.

As heretofore mentioned the time switch 7 is electrically operated to close the shunt circuit 8 and includes an electro-magnet 9 which, when energized, attracts the arm 10 of the switch. The magnet 9 is energized through line 11 and when this occurs the arm 10 of the switch 7 is drawn to the magnet. A spring 12 is provided for returning the arm 10 to the contact 13 when the magnet becomes de-energized and thus makes a circuit through the shunt 8.

The line switches 3 are also electrically operated in this instance to close the circuit through the resistance 5 to the motor 1 and these switches include an electromagnet 14 adapted, when energized, to attract and actuate the arms 15 to close the circuit through engagement with the contacts 16. A spring 17 is provided to open the circuit upon de-energization of the magnet 14. A contact arm 18 is provided for the switch 7 which engages with the contact 19 and thus energize the magnet 14 through line 20. A start switch 21 which, in this instance, is illustrated as a spring pressed button switch, is provided and upon the closing of this switch the electro-magnet 9 of the shunt circuit is energized attracting and actuating the switch arm 10 to open the shunt circuit. The actuation of the switch arm 10 causes the line switch 3 to be closed. A stop switch 22 is provided to de-energize the electro-magnet.

In order to provide for the automatic operation of the shunt circuit switch 7 to close the circuit around the resistance 5 after a period of time, following the closing of the start switch 21, I provide a condenser 23 and a resistance 24 therefor, the condenser and resistance being in series with the coil of switch 7. It will be seen that the condenser 23 and the resistance 24 are in the circuit so as to be energized when the start switch 21 is closed by the voltage drop across the resistance 5.

The function of the resistance 24 in circuit with the condenser 23 is to delay the charging of the condenser which would otherwise receive its charge immediately upon closing of the start switch 21. This delay in the charging of the condenser results in the delay of the time switch 7 from closing the shunt circuit 8. As the condenser 23 receives its charge the current in the line diminishes and consequently the strength of the magnet 9 becomes, after a period of time, insufficient to hold the switch arm 10 against the force exerted by the spring 12.

The condenser 23, resistance 24 and switch 7 may be of the adjustable type so that the time operation of the switch 7 may be varied as desired.

With the line switches closed and the shunt circuit open, current flows to the motor through the resistance 5 and because of the resistance only a definite amount of the potential current passes to the motor due to the voltage drop across the resistance. The arm 15 of the line switch is provided with an arm 23 for engaging with contacts 24 so that in case the start switch 21 is released the line switch 3 will remain closed.

The complete operation of the circuits is as follows: The start switch 21 is first closed and upon so doing the magnet 9 is energized which functions to actuate the switch arms 10 to open the shunt circuit 8. Actuation of the arm 10 automatically closes the circuit to the magnet 14 of the line switch 3 so that the circuit is closed through the conductor 2 and resistance 5 to the motor. The motor 1 now receives a part of the potential current value which may be regulated to be sufficient to start the rotor of the motor. The condenser 23 and resistance 24 in series with the switch 7 are also energized when the start switch 21 is closed so that as the condenser becomes charged the magnet 9 of the switch 7 becomes de-energized. When the strength of the magnet is no longer sufficient to hold the switch arm 10 the spring acts to close the shunt circuit 8 and thus short circuit the resistance 3.

Upon receiving the small current through the resistance 5 the rotor of the motor 1 should start to operate if not overloaded and, during the elapsed time-period gains momentum so that when the shunt circuit is closed to deliver the entire current, sparking will not occur at the commutator nor the motor receive a shock. However, should the motor be overloaded, it will be seen that the current will nevertheless be relayed thereto through shunt circuit 8, in which event the line fuses (not shown) will disconnect the circuit in the usual manner.

Figure 4:
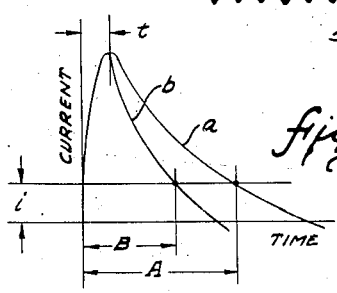
Fig. 4 shows several curves which illustrate the operation of the system under different loads.

When the motor is overloaded, that is, when the rotor will not accelerate, the voltage across the resistance 5 will be constant while the current will diminish through the condenser 23, resistance 24 and coil 9 as represented by the curve $a$ of Fig. 4. In Fig. 4 $i$ represents the point at which the current energizing coil 9, produces insufficient flux in the magnet to hold the contacts open so that when the current diminishes by reason of the condenser 23 and resistance 24 in series with the coil 9, the shunt circuit is closed. The time period over which the current diminishes to point $t$ when the voltage across resistance 5 is constant is represented at A in Fig. 4 and this time period is the longest for stalled rotor after which the line fuses disconnect the motor from the source of energy.

It will be understood that the motors shown in these circuits are direct-current motors although the use of the invention is not limited to such motors. When direct-current motors are started it is well known that they draw a large current from the source of supply which, as heretofore mentioned, is objectionable in that the motor receives a shock from the large voltage. The resistances are therefore provided so that the motors receive only a measure of the line current to start. When the motor is not too overloaded to start by the current passing through the resistances the motor will start and as it accelerates will generate a carrier electro-motive force. This carrier electro-motive force opposing the current from the source of supply causes a diminishing of current through the resistance 5 and this diminishing current diminishes at a rate depending upon the rate of acceleration of the motors. The coil 9, condenser 23 and resistance 24 being in parallel with the resistance 5 also has a diminishing current therethrough when the motor accelerates and diminishing at a rate proportional to the rate of acceleration of the motor. Consequently under light loads, which permit rapid acceleration of the motor, the coil 9 is de-energized sooner to close the circuit 8 than would be the case under heavy loads.

When the motor is not too heavily loaded to accelerate by the current passing through resistance 5, it will be understood that the voltage across resistance 5 will not be constant as in the aforementioned instance but rather will diminish in accordance with how rapidly the rotor accelerates. Under this condition of diminishing voltage, the current will diminish through coil 9, condenser 23 and resistance 24 as indicated in Fig. 4 at "b" in time B. Or in other words the shunt switch 7 will be permitted to operate sooner than when the motor does not accelerate. It will now be understood that between the extremes of no load and overload on the motor, that the time of closing of the shunt switch varies so that the motor may be used to the fullest extent without injury thereto.

The above described characteristics of the circuit of Fig. 1 are also true of the circuit of Figs. 2 and 3 however, in these circuits, the shunt circuits are opened by the charging current of the condenser in the short interval of time "t" while in Fig. 1 the relay is open electrically before the line switch is closed.

Referring to Fig. 2 of the drawing, the numeral 30 designates the motor in the line 31. Manually or magnetically operated switches 33 are provided in this instance for closing and opening the line circuit 31. A resistance 34 is arranged in the line 31 so as to permit only a measure of the potential current to energize the motor 30 upon closing the line switches 33. Like the resistance in the circuit of Fig. 1 the resistance 34 provides for a definite limit of current to initially energize the motor.

A shunt circuit 36 is provided in parallel circuit with the resistance 34 and controlling the shunt circuit is an electrically operated switch designated in general at 37. Normally the arm 38 of the switch 37 is held in open position, as shown, by a spring 39 or by gravity. By normally open is meant that the shunt circuit 36 is open through the switch 37 when the motor 30 is inoperative. The switch 37 includes an electromagnet 40 which when energized, through line 41, functions to draw the arm 38 to the contact 42 and thus close the circuit.

In order to delay the energization of the magnet 40 and consequently the shunting of the resistance 34 a condenser 44 and a resistance 45 is arranged in the circuit to delay the operation of a second magnetic switch designated in general at 47. This second switch 47 is also magnetically operated through the energization of the coil 48 and, as illustrated, is of the type having a core or arm 50 which returns by its own weight or spring to the position shown. In this position the arm 50 engages with contacts 51 and this completes the circuit through line 41 to the magnet 40. This closed position, as shown, is the position of the arm 50 before the line switches 33 are closed.

Preferably the switch 47 is a relatively sensitive type compared to the shunt circuit switch 37 so that upon closing of the line switches 33 it actuates to quickly open the line 41 to the switch 37. The condenser 44 and resistance 45 being in circuit with the coil 48 also receives a charge and upon so doing de-energizes the coil with the result that the arm 50 descends to close the line 41 to the switch 37. The switch 37 then operates to close the shunt circuit and connects the motor directly with the source of electrical energy.

As in the circuit of Fig. 1, the electrically operated switch 37 in the circuit of Fig. 2 operates to close the circuit through shunt 36 in a time period dependent upon the rate of acceleration of the motor 30. As the motor 30 accelerates the back electro-motive force generated thereby causes a constant diminishing of the current through the coil 48, resistance 45 and condenser 44. Fig. 4 may be referred to for an understanding of the relation of the current with respect to time in the circuit of Fig. 2 which relation is the same as that of Fig. 1.

When the motor stalls the voltage is constant through the coil 48, resistance 45 and condenser 44, so that the time period required for the condenser 44 to be charged and thus equalize the current through coil 48, and de-energizing the same to the point $i$, will be "A". This time period between the closing of the line switches 33 and the automatic closing of the switch 27 will be the longest for overloaded rotor and shortest when the motor is not under any load.

When the motor starts on closing the line switches 33 its back electro-motive force will result in a constant diminishing of the voltage through the coil 48, resistance 44 and condenser, and in addition the condenser will function to further diminish the current to the coil 48. Under this condition the current diminishes to the point $i$ in a time period B represented in Fig. 4 by the curve "b". Or in other words, the time required for the current to diminish to the point $i$ at which the arm 50 of the switch 47 is released depends upon the rate of acceleration of the motor when the motor starts and if it doesn't start it depends upon the condenser 44 to de-energize the coil over a longer period of time.

Referring now to Fig. 3 of the drawing, this figure illustrates a circuit having a number of steps for accelerating an electric motor. The motor is indicated in general at 53 in the line 54 having the line switches 55. Resistances 56 are provided in the line 54 to permit only a measure of the potential current to energize the motor 53 when the line switches 55 are first closed. A shunt circuit 57 is provided in parallel circuit with the resistances 56 and a magnetically operated switch 58 is provided to open and close the shunt circuit. This switch 58 is similar to the switch of Fig. 2 having a magnet 60 which, when energized, actuates the arm 61 to engage with the contact 62. A spring or gravity 63 is provided to return the switch arm 61 to open position when the magnet 60 becomes de-energized.

As in Fig. 3 the magnet 60 is energized through line 64 and in this line 64 is provided a second, but preferably a relatively sensitive, magnetic switch indicated in general at 65. Before the closing of the line switches 55 the magnet switch 65 is normally closed as shown. However, upon the closing of the switches 65 the coil 66 of the magnetic switch 65 is energized by the condenser charging current and the circuit 64 thus broken. In series with the coil 66 is a condenser 70 and a resistance 71, therefore, the resistance 71 permitting the condenser 70 to receive a charge after a period of time. When the condenser 70 receives this charge the magnetic switch 65 becomes de-energized permitting the circuit 64 to be closed thus energizing the coil 60 and closing the shunt circuit. The relation of the current with respect to time, as illustrated in Fig. 4 and described in Figs. 1 and 2 is also true of Fig. 3.

From the foregoing description it will be seen that I have provided new and improved circuits for electric motors. These circuits permit an electric motor to be energized in steps permitting the motor to first receive a certain current value, less than the line value, so that it will not be damaged upon starting and after a period of time to cause the motor to receive the entire voltage. This time delay, it will be appreciated will vary as the load or accelerating of the motor so that light and heavy loads may be carried by the motor without loss of time and without injury to the motor.

Having thus fully described my invention, its utility and mode of operation, what I claim and desire to secure by Letters Patent of the United States is—

1. In an electric motor circuit, an electric motor, a line circuit for the electric motor including a resistance, a feed back circuit connected in the line circuit across said resistance, a condenser and a coil in said feed back circuit, an electromagnet, a circuit for the electro-magnet connected across the resistance in the line circuit, a contact member normally closing the electromagnet circuit, said contact member being movable to position to break said circuit upon energization of the coil of the feed back circuit and a shunt circuit connected across the resistance of the line circuit, an armature for the electromagnet connected into the shunt circuit, the arrangement being such that upon energization of the electro-magnet the armature is moved to close the shunt circuit across the resistance of the line circuit.

2. In an electric motor circuit, an electric motor, a line circuit for the electric motor, a resistance connected into the line circuit, a feed back circuit connected to the line circuit across said resistance, a condenser, a resistance and a coil in the feed back circuit, an electro-magnet circuit connected in the line circuit across the resistance and electric motor, a contact member normally closing the electro-magnet circuit, the contact member being provided with a portion forming a core for the coil of the feed back circuit, the arrangement being such that upon energization of the feed back circuit the contact member is moved to position to break the electromagnet circuit, a shunt circuit connected across the resistance of the line circuit, an armature in the shunt circuit, means normally holding the armature in position to break the shunt circuit, the electro-magnet of the electro-magnet circuit being so positioned that upon energization of said electro-magnet circuit the armature is moved to position to close the shunt circuit across the resistance of the line circuit.

3. In an electric motor circuit, an electric motor, a line circuit for the electric motor including a resistance, a feed back circuit connected in the line circuit across said resistance, a condenser, resistance and coil in said feed back circuit, an electro-magnet circuit, an electromagnet connected in said electro-magnet circuit, the electro-magnet circuit being connected across the resistance and motor in the line circuit, a contact member normally closing the electro-magnet circuit, said contact member having a portion extending through the coil of the feed back circuit, the arrangement being such that upon energization of the feed back circuit the contact member is moved to break the electromagnet circuit and upon deenergization of the feed back circuit the contact member moves to position to close the electro-magnet circuit and a shunt circuit connected across the resistance of the line circuit, means normally holding the armature in position to break the shunt circuit, the arrangement being such that upon energization of the electro-magnet circuit the armature is moved to position to close the shunt circuit.

HAROLD L. SMITH.